July 14, 1953

L. F. CAMPBELL 2,645,216

CLOSED CYCLE ENGINE

Filed Jan. 21, 1943

INVENTOR
LAWRENCE F. CAMPBELL

By

Attorney

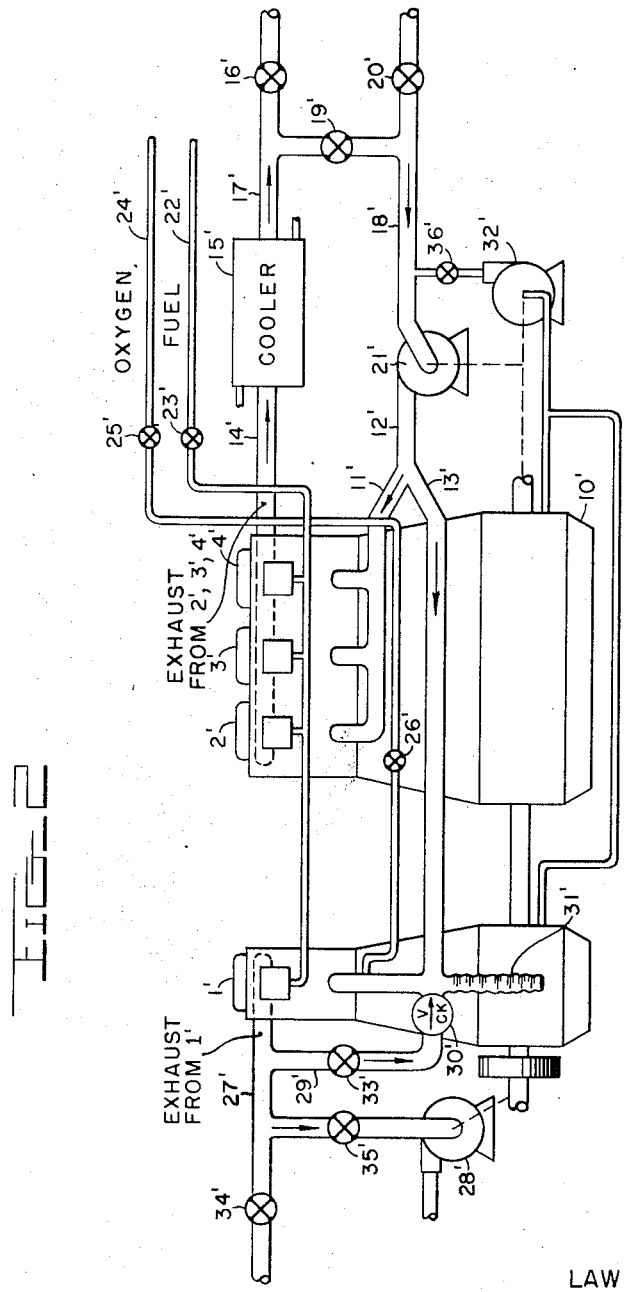

Patented July 14, 1953

2,645,216

UNITED STATES PATENT OFFICE 2,645,216

CLOSED CYCLE ENGINE

Lawrence F. Campbell, Silver Spring, Md.

Application January 21, 1943, Serial No. 473,051

8 Claims. (Cl. 123—119)

(Granted under Title 35, U. S. Code (1952), sec. 266)

This invention relates to internal combustion engines, and it is particularly concerned with the operation of such engines in the absence of the atmosphere or where the normally plentiful supply of atmospheric oxygen is not available.

Internal combustion engines are used extensively for propulsion of all kinds of vehicles because they are capable of delivering high power, are comparatively efficient and their fuel is easily carried. However, all such engines require oxygen for combustion of the fuel, and this is ordinarily obtained in unlimited quantity from the atmosphere. Diesel engines, which are the most efficient, require exceptionally large amounts of air because for this type of engine a greater excess of oxygen is required over that necessary to burn the fuel for stable, dependable operation. Therefore, as a practical matter, internal combustion engines have been confined to uses where air is plentiful, and for services in the absence of air it has been generally necessary to employ electric power.

One of the most striking of these situations is the operation of a submarine. While on the surface of the sea the vessel is propelled by means of one or more diesel engines, but when under water the propulsion is obtained from electric motors operating from storage batteries. Thus the submarine must carry two separate power plants, one of which requires many heavy batteries, constituting a disproportionately large part of the vessel's displacement. Also, while on the surface, it is necessary for the diesel engine to operate a generator to recharge the storage batteries. The advantages of dispensing with the present underwater method of submarine propulsion by permitting operation of the internal combustion engine at all times, such as the large saving in weight, space, power requirements and maintenance, are so obvious that many experimenters have attempted for years to solve the problem of operating an internal combustion engine in the absence of the atmosphere.

With respect to submarine propulsion the operation of an internal combustion engine under water presents two problems not necessarily present in its operation merely in the absence of the atmosphere, and these are: (1) efficient use of the oxygen provided for combustion of the fuel, and (2) disposal of exhaust in such a manner as will not cause a wake on the surface of the water. Methods for disposing of the exhaust include (a) compressing and storing it, (b) absorbing the carbon dioxide in a scrubbing column and storing the unabsorbed gases, and (3) discharging the exhaust into the sea through porous plates to give a fine dispersion.

This invention provides a method of operating internal combustion engines, particularly diesel engines, of either the two- or four-stroke type, not only in the absence of the atmosphere, but also under water. The method includes operation of the engine with high oxygen efficiency and with an exhaust which can easily be disposed of without creating telltale evidence, so that the method also includes underwater propulsion. The invention also includes internal combustion engines, particularly diesel engines, especially designed for such operation and eminently suited for propulsion of submarines both on the surface of the sea and under water.

In the absence of the atmosphere it is necessary to supply oxygen to the engine in the same way that the fuel is supplied, that is, from storage tanks or reservoirs maintained in the vehicle. Accordingly it has been proposed to carry highly compressed or liquified air in suitable pressure tanks in the submarine for operation of the engines. This proposal has proven to be impractical for a number of reasons. For one thing, between about 3½ and 4 pounds of oxygen are required for combustion of each pound of ordinary diesel fuel oil, which requires compressing (or liquifying) and storing approximately 15 to 17 pounds of air for each pound of fuel to be used under water. A still greater drawback is the nature of the exhaust emitted from an "air-burning" engine.

Under ordinary operation the exhaust of an internal combustion engine contains large quantities of nitrogen and water vapor, and diesel engine exhaust also includes large quantities of carbon dioxide, a considerable amount of unused oxygen and a small amount of carbon monoxide. When such an exhaust is disposed of, for example, by discharging into the ocean, the water vapor condenses and the carbon dioxide dissolves in the sea water, particularly if the discharge is under much pressure. The carbon monoxide is present in so small an amount that whether or not it also dissolves, it is sufficiently dispersed so as to leave no trail at the surface.

The oxygen and nitrogen, however, present a different situation. Both of these gases are only sparingly soluble in water with the result that they are not removed by scrubbing and if discharged into the sea they rise to the surface and leave a noticeable trail or wake of the movements of the submarine. This is true even at great depths where the hydrostatic pressure is very high. Therefore, although air is a suitable medium for combustion, it is undesirable from the standpoint of underwater exhaust disposal because there is no way to get rid of the nitrogen in the exhaust.

Instead of using air, the method of this invention uses oxygen, preferably substantially free of nitrogen with which to burn the fuel in the engine. The oxygen may conveniently be stored under pressure or be liquefied. Such a system requires that the oxygen be used efficiently and that the concentration of the oxygen in the exhaust be below that which would hinder exhaust disposal as described above. In general it is highly advantageous to have the oxygen concentration below about 10% oxygen on a dry basis (i. e. about 6% oxygen if the water vapor is taken into consideration).

As is well known, it is impractical to operate an internal combustion engine on a mixture of pure oxygen and fuel because of the excessively high temperatures reached and the detonation of the mixture, rather than its burning, in the cylinders. It is also known that internal combustion engines will not operate satisfactorily if the oxygen concentration is low, even though the amount of oxygen present in the cylinder may be enough for stoichiometric combustion of the fuel. This is particularly true of diesel engines. The presence of these limits requires (1) that an inert gas be present in the cylinders during firing, and (2) that some method be employed for reducing the oxygen concentration in the exhaust, and it should accomplish useful work at the same time.

The method of this invention meets the first requirement by recirculating the exhaust gases back into the cylinders, after suitable enrichment with oxygen, and bleeding off a small amount of the exhaust equivalent to the increase in carbon dioxide and water caused by combustion of the fuel.

Experience has shown that stable dependable operation of the engine is not compatible with maintenance of a minimum of oxygen in the exhaust, under ordinary methods of operation. Theoretically, the maximum amount of oxygen necessary in the cylinders is the stoichiometric amount for combustion of the fuel. However, it is exceedingly difficult to obtain complete combustion under this condition, and the operation is critical and unstable. It is particularly true with diesel engines, and it is impossible to operate any two-stroke diesel engines on such proportions of fuel to oxygen because of the excess air (or gas) necessary for scavenging. The engine operates erratically and responds unfavorably to changes in load. Similarly, impulsive disturbances, which are not entirely avoidable, cause various cylinders to miss first and sometimes stall the engine. To overcome this it has been proposed to operate two engines in series, the primary one being supplied with excess oxygen and the secondary one supplied with the exhaust from the first with addition of only sufficient oxygen to permit ignition in the cylinders. This proposal has proven little better in practice than operation of the single engine on reduced oxygen because the secondary engine is subject to the same erratic operation, and the primary engine depends on the secondary one for removal of its exhaust.

The method of this invention obviates the difficulties of erratic operation of the secondary engine as well as of the primary one by maintaining extremely close coupling between the two, not only with respect to the delivery of power but also with respect to the transfer of exhaust from one to the other. The primary and secondary engines may have their shafts direct coupled or through gears, or by electrical means or other positive common transmission system, but the preferred form of the invention combines the primary and secondary engines into a single engine by the simple means of isolating one or more cylinders from the main bank, and supplying the bleed-off exhaust from the main bank to these isolated cylinders (which may be referred to as "economizer" cylinders) with only enough oxygen added to permit combustion. The main bank is operated with excess oxygen. In this way the closest possible coupling is maintained in all respects between the primary or main bank which is operated under ideal combustion conditions and the one or more economizer cylinders, or secondary bank, cannot falter or stop because of impulsive disturbances, variations in load, and the like, with the result that the engine operates stably and dependably and is free from critical adjustment.

In order that the invention may be more clearly understood the operation of a four-cylinder diesel engine is described in detail with reference to the accompanying drawings in which:

Fig. 2 illustrates, diagrammatically, the use of two separate engines and the coupling between them.

Figure 1:
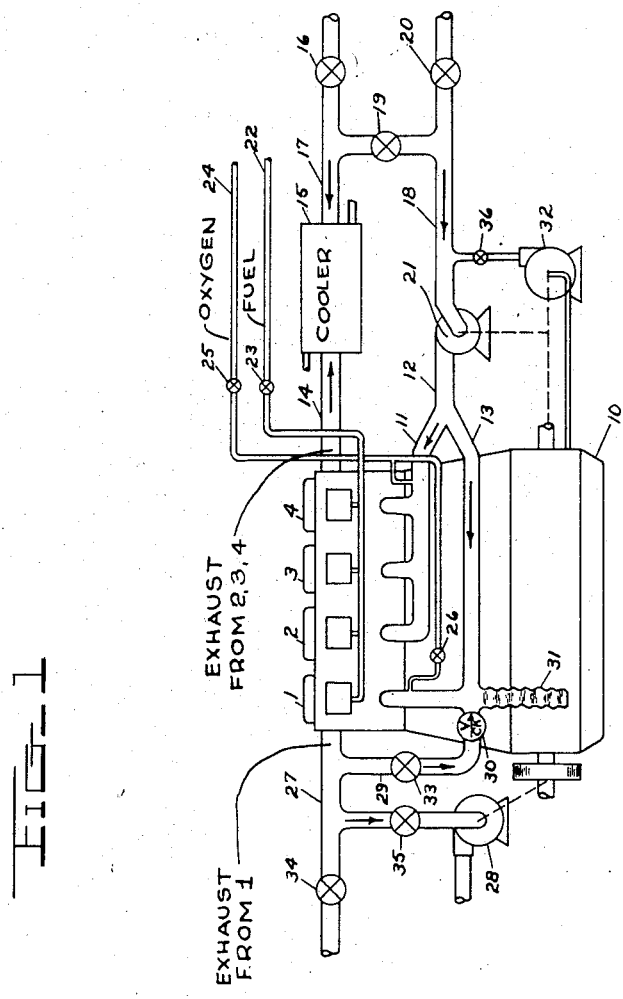
Fig. 1 is a diagrammatic showing of the invention applied to a four-cylinder diesel engine.

Referring to the drawings in detail and first to Fig. 1, here is shown, symbolically, a diesel engine 10 with four cylinders numbered 1 to 4 for identification. A branch 11 of an intake manifold 12 supplies air or oxygen to cylinders 2, 3 and 4, and a branch 13 of the intake manifold 12 supplies cylinder 1 (the economizer cylinder). An exhaust manifold 14, connected to cylinders 2, 3 and 4, connects to a heat interchanger or cooler 15 which, in turn is connected to an outlet valve 16 by means of a pipe 17. The pipe 17 also connects to a pipe 18 through a valve 19. The pipe 18 connects an inlet valve 20 and the valve 19 with the intake of a supercharger or compressor 21 (driven by the engine 10) which discharges into the intake manifold 12.

Fuel is supplied to standard injection pumps at each cylinder through a line 22, controlled by a valve 23, in the customary manner.

Oxygen is supplied through a line 24, controlled by a valve 25, which enters the branch 11 of the manifold 12 just prior to the cylinders 2, 3 and 4, and enters the branch 13 just before the intake of cylinder 1. The oxygen to cylinder 1 is controlled by a valve 26. This provides the differential oxygen control whereby cylinders 2, 3 and 4 are run on a plentiful supply and cylinder 1 is run on a restricted supply, so that the final exhaust discharged from the engine contains very little unused oxygen.

The exhaust from cylinder 1 is normally removed through a pipe 27 which may be vented (for surface operation) through a valve 34 or discharged through a valve 35 to a pump 28 (for underwater operation) which may be driven by the engine 10. Since, for the same engine speed, the volume of exhaust recycled from cylinders 2, 3 and 4 decreases with decrease in load, cylinder 1 tends to pull a vacuum in the intake manifold 12 when the engine is lightly loaded, and this is true in spite of the compressor 21. Therefore a return loop 29 from the pipe 27 is provided as a vacuum breaker. The intake gases for cylinder 1 are prevented from by-passing through the loop 29 by a fast-acting ball check valve 30. When the return loop 29 is not used, it may be closed off by a valve 33. Also a surge chamber 31 is provided in the loop 29 on the intake side of the check valve 30 to reduce fluctuations of intake pressure.

For ordinary, open cycle operation, such as would be employed for submarine propulsion on the surface of the sea, the valves 19, 25, 33 and 35 are closed and the valves 16, 20 and 34 are open. The air is drawn in through the valve 20 and is distributed to all cylinders through the manifold 12. Similarly the exhaust of cylinders 2, 3 and 4 is discharged through the valve 16 and the exhaust from cylinder 1 is discharged through the line 27 and vented directly to the air. Fuel is supplied through the line 22, and the engine operates in the usual manner.

For closed cycle operation the valves 19, 33 and 35 are opened and the valves 16, 20 and 34 are closed. At the same time oxygen is supplied to the cylinders by opening the valve 25. In order to make the engine run smoothly and dependably under load (which is vital for underwater propulsion) a large excess of oxygen is supplied to cylinders 2, 3 and 4 (the primary group) over that necessary for combustion, and for a typical closed cycle run this was about 48% by volume on a dry basis (33% actual volume) which resulted in about 16% oxygen in the recycled exhaust gases. An oxygen concentration of only 16% is not sufficient to ignite fuel in cylinder 1, partly due to the high proportion of carbon dioxide in the intake. Therefore a small amount of oxygen is added to bring the concentration just high enough to fire in the cylinder (for this engine it was about 20%). Runs over long periods consistently showed an oxygen concentration in the exhaust removed from cylinder 1 of lower than 5% on a dry basis (about 3% on a wet basis) which is negligible. A certain amount of gas leakage around the pistons is unavoidable so that the crankcase soon builds up a slight positive pressure unless a breather opening is provided. However, when under water, these fumes must not escape into the submarine and, as they represent a fuel and oxygen loss anyway, they are returned to the pipe 18 by means of a blower or pump 32 and valve 36.

A comparison of time-pressure curves of cylinder 1 and the other cylinders shows that cylinder 1 consistently delivers useful work. Since the entire bleed-off exhaust from the other cylinders must pass through cylinder 1 where the oxygen is reduced to a low concentration, an economy of oxygen is obtained. Thus, the use of one cylinder of the engine (which is always synchronized with the other cylinders) as an economizer cylinder permits a high degree of oxygen efficiency and at the same time reduces the concentration in the exhaust to the point where disposal thereof in any of the ways indicated above is easily effected. And all this is done without affecting the dependability or smoothness of the engine's operation.

The supercharger 21 is not necessary to the satisfactory operation of the engine in closed cycle operation because the amount of oxygen fed to the cylinders is at all times controllable. However, the supercharger reduces the back pressure on the primary bank of cylinders and thus also aids in the scavenging of exhaust gases.

The number of cylinders which must be devoted to reducing the oxygen concentration in the exhaust, i. e., economizer cylinders, will depend on the total number of cylinders in the engine. At least one cylinder is required, and the smaller the number that can be employed to remove the products of combustion under full load the more efficient and dependable will be the operation of the engine. Obviously it is not necessary to discharge all of the exhaust from one or two economy cylinders. If desired three or four economy cylinders may be utilized in a large engine (say where two would be adequate), recycling a part of their exhaust through the vacuum breaker loop and discharging the rest, if the most stable operation is not required. Similarly, less than the required number of economizer cylinders may be used, if optimum oxygen efficiency is not desired and part of the recycled gases is removed from the engine without passing through the economizer cylinders. As an upper limit it is inadvisable to employ more than half of the cylinders as economy cylinders because the engine becomes less dependable in operation and it becomes increasingly difficult to keep the oxygen concentration down to a minimum in the exhaust.

The amount of cooling of the recycled exhaust gases which is necessary depends on a number of factors, and some of this heat can be utilized to provide a comfortable atmosphere for the crew of the submarine, or it can be easily removed by heat exchange with the sea. The temperature limits between which the cooled, recycled gases should be maintained are not critical. Due to the high heat capacity of carbon dioxide, as compared to nitrogen, the intake gases must be hotter than when using air, or else the adiabatic compression in the cylinders will not raise the temperature high enough to ignite the fuel in a diesel engine. Thus the function of the heat interchanger 15 is to extract heat from the recycled gases, but to leave sufficient heat to permit satisfactory ignition.

In the engine tested the intake temperature was found to be optimum at about 200° to 250° F. Of course, the exhaust temperatures will run a little higher in closed cycle operation than when the engine is operating on air, so that the maximum efficiency, and hence power output, will be slightly less.

Although the invention has been described in detail with reference to a diesel engine, the method is equally applicable to all kinds of internal combustion engines where oxygen economy is important. Also, while the description has been confined primarily to submarine propulsion the invention can be applied to any situation where an internal combustion engine is used under conditions of insufficient atmospheric oxygen, such as stratospheric flight.

As has already been stated, the method of this invention can be accomplished by passing the bleed-off from the recycled gases through the cylinder or cylinders of a separate secondary engine tightly coupled to the primary engine. The latter modification is diagrammatically illustrated in Fig. 2 where the primary group of cylinders 2', 3' and 4' constitute one engine and the secondary cylinder 1' constitutes a separate engine closely coupled to the first through a common shaft. The various elements of Fig. 2 corresponding to certain elements of Fig. 1 are designated by the same reference numerals primed.

The invention described herein may be manufactured and used by or for the Government of the United States of America for governmental purposes without the payment of any royalties thereon or therefor.

I claim:

1. Method of operating a multi-cylinder internal combustion engine in the absence of sufficient atmosphere for combustion which comprises, supplying fuel to the cylinders of said engine for combustion therein, removing exhaust from a part of the total number of cylinders in an amount equivalent to the products of combustion of said engine, recycling the remaining exhaust gases from said engine back to said first mentioned cylinders, adding oxygen to said gases so as to maintain in the intakes to those cylinders whose exhaust is completely recycled a substantial excess over that necessary for combustion and to maintain just sufficient oxygen for combustion in the intake to any cylinder any exhaust of which is removed from the engine.

2. Method of operating a multi-cylinder internal combustion engine as claimed in claim 1 which additionally includes preventing build-up of vacuum in said intakes during operation under light load by returning a portion of the unrecycled exhaust to said intakes through a check valve.

3. Method of operating a multi-cylinder internal combustion engine which comprises, supplying fuel to all the cylinders of said engine for combustion therein, removing exhaust from a part of the total number of cylinders in an amount equivalent to the products of combustion of said engine, recycling the remaining exhaust gases from said engine back to said first mentioned cylinders, adding oxygen to said gases so as to maintain in the intakes to those cylinders whose exhaust is completely recycled a substantial excess over that necessary for combustion and to maintain just sufficient oxygen for combustion in the intake to any cylinder any exhaust of which is removed from the engine, and disposing of the removed exhaust.

4. Method as claimed in claim 3 wherein said engine is a diesel engine, and wherein the blow-by from the cylinders is removed from the crankcase of said engine and returned to the recycled exhaust gases.

5. Method of operating a power plant comprised of closely coupled multi-cylinder diesel engines in a submerged submarine which comprises, supplying fuel to all the cylinders of said engines for combustion therein, removing exhaust from a part of the total number of cylinders in an amount equivalent to the products of combustion of said engines, recycling the remaining exhaust gases from said engines back to said first mentioned cylinders, adding oxygen to said gases so as to maintain in the intakes to those cylinders whose exhaust is completely recycled a substantial excess over that necessary for combustion and to maintain just sufficient oxygen for combustion in the intake to any cylinder any exhaust of which is removed from the engines, returning the blow-by from the cylinders to said recycled exhaust gases, and compressing the removed exhaust to a pressure in excess of the hydrostatic pressure on the submarine and letting it escape into the water.

6. Method of operating a power plant comprised of closely coupled multi-cylinder diesel engines in a submerged submarine which comprises, supplying fuel to all the cylinders of said engines for combustion therein, removing exhaust from a part of the total number of cylinders in an amount equivalent to the products of combustion of said engines, recycling the remaining exhaust gases from said engines back to said first mentioned cylinders through a supercharger, adding oxygen to said gases so as to maintain in the intakes to those cylinders whose exhaust is completely recycled a substantial excess over that necessary for combustion and to maintain just sufficient oxygen for combustion in the intake to any cylinder any exhaust of which is removed from the engines, returning the blow-by from the cylinders to said recycled exhaust gases, and compressing the removed exhaust to a pressure in excess of the hydrostatic pressure on the submarine and letting it escape into the water.

7. An internal combustion engine capable of operating in the absence of the atmosphere which comprises, a crankshaft, a plurality of cylinders and pistons connected to said crankshaft, means for supplying fuel to said cylinders, an exhaust manifold connected to the larger part of the total number of said cylinders, an intake manifold connected to all of said cylinders and to said exhaust manifold whereby exhaust gases are recycled back to said cylinders, means for supplying oxygen to said gases so that a substantial excess of oxygen is supplied to the intakes to those cylinders connected to said exhaust manifold and only sufficient oxygen for combustion is supplied to all other cylinders, and means for removing exhaust from said other cylinders equivalent to the products of combustion of the entire engine.

8. Method of operating a power plant comprised of a plurality of internal combustion engine cylinders in the absence of sufficient atmosphere for combustion wherein all the cylinders are closely coupled, which comprises supplying fuel to all the cylinders for combustion therein, removing exhaust from a relatively small secondary group of cylinders in an amount equivalent to the products of combustion of all of the cylinders, recycling the remaining exhaust gases back to said first mentioned cylinders, adding oxygen to said gases so as to maintain in the intake to a relatively large primary group constituted of all the cylinders except those of the secondary group a substantial excess over that necessary for combustion and to maintain just sufficient oxygen for combustion in the intake to said secondary group.

LAWRENCE F. CAMPBELL.

References Cited in the file of this patent

UNITED STATES PATENTS

| Number | Name | Date |
|---|---|---|
| 1,099,445 | Jaubert | June 9, 1914 |
| 1,950,586 | Zubaty | Mar. 13, 1934 |
| 2,113,601 | Pratt | Apr. 12, 1938 |
| 2,249,997 | Wydler | July 22, 1941 |